March 10, 1925.
L. A. THOMPSON
FOOD DISPENSER
Filed Feb. 28, 1922
1,529,379
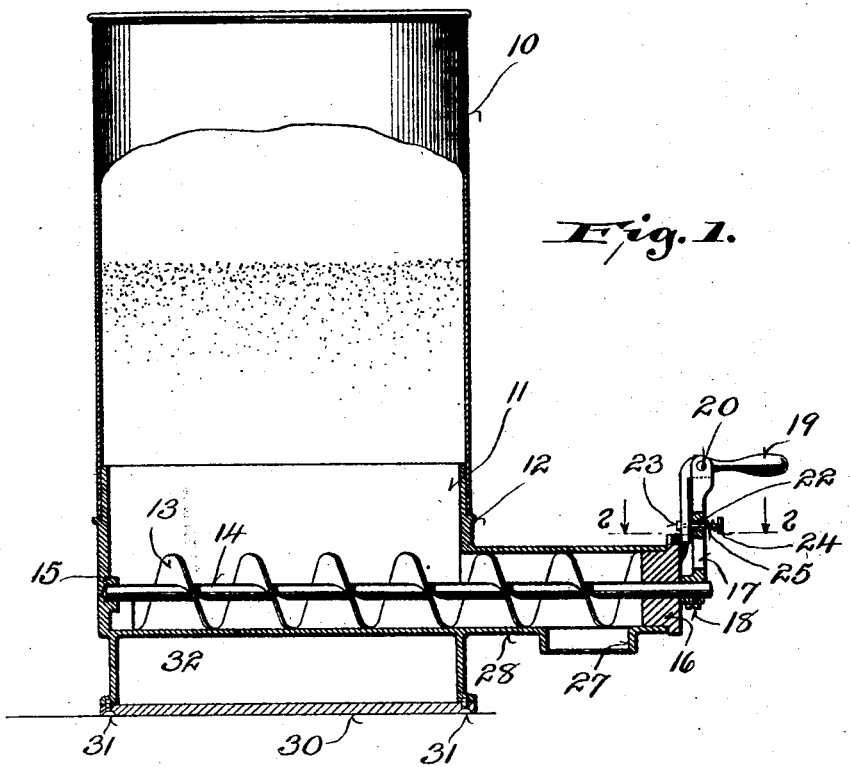
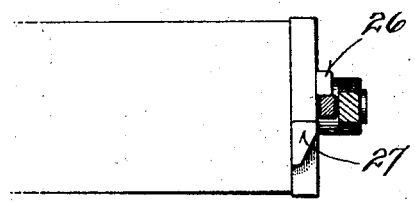
Witness:
R. E. Weber
Inventor:
Livingston A. Thompson
By
Attorneys Patented Mar. 10, 1925.

1,529,379

UNITED STATES PATENT OFFICE.

LIVINGSTON A. THOMPSON, OF WAUKESHA, WISCONSIN.

FOOD DISPENSER.

Application filed February 28, 1922. Serial No. 540,018.

*To all whom it may concern:*

Be it known that I, LIVINGSTON A. THOMPSON, a citizen of the United States, and resident of Waukesha, in the county of Waukesha and State of Wisconsin, have invented certain new and useful Improvements in Food Dispensers; and I do hereby declare that the following is a full, clear, and exact description thereof.

The invention relates to devices for dispensing malted milk and other granular or pulverulent foods or materials from a container.

It comprises a device adapted to be applied to the large open mouth of a container, having a hopper with a tubular extension thereon, a worm for feeding the material from the hopper on the inversion of the container, and a handle adapted to be rotated to dispense the substance through a discharge spout, means being provided to automatically interrupt the movement of the handle on one complete rotation.

The primary object of the invention is the provision of conveniently operated devices capable of removing material from a container in a desired quantity. The mere movement of the handle about the shaft produces a dispensing operation. There is no spilling or wastage, no adhesion of the substance to spoons, but a gradual and positive discharge results, all of the material in the container being fed out, the force of gravity assisting in the operation, which is positive and rapid.

An additional object is the provision of parts operative to measure definitely the amount of material fed. Since means are provided whereby only one rotation of the handle about the shaft results, it follows that the worm deposits always the same quantity of material on the manipulation of the handle so that the device is necessarily quite accurate. It is fool-proof. To discharge more than the particular unit which corresponds to a complete rotation of the handle, the operator would have to disregard the interrupting operation, which is practically impossible.

Other objects of the invention are the provision of a device which takes up a minimum of room, completely closes the container, and protects it from dust and moisture.

With the above and other objects in view, which will appear as the description proceeds, my invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of the present invention constructed according to the best mode I have so far devised for the practical application of the principles thereof, and in which:—

Figure 1 is a central, vertical section.

Figure 2 is a section on the line 2—2 of Figure 1, showing the outlet tube enlarged.

To container 10, which may be of glass or paper and of any size or shape, but preferably having a large open mouth, the dispenser is fitted. It comprises a hopper 11 adapted to be received in the open mouth, the inward movement thereof being limited by shoulder 12 which contacts with the edge of the container on all sides. The dispenser is applied to the container and then the entire apparatus is inverted to the position shown in Figure 1, wherein the malted milk, or other substance, is fed down into the hopper 11, which, by its converging sides, deposits the material about worm 13, the shaft 14 of which is received in a boss 15 on one side and extends through cap 16 on the other, an arm 17 being secured by screw 18 to the projecting end. Handle 19, by means of pivot 20, is secured to the upper end of the arm. It is rigid with finger 21. A rod 22 is extended through finger 21, and an opening in the arm 17, and operates to limit the separating movement of the finger and the arm by means of heads 23 and 24 rigid with the rod, a spring 25 bearing against head 24 holding finger 21 in a normal, contiguous position with respect to the arm. In this normal position the finger contacts with an abutment 26.

In the feeding of material, handle 19 is manually depressed, which moves finger 21 to the left, as viewed in Figure 1, so as to free it from contact with abutment 26. The arm 17 is then free to rotate and the operator moves it in suchwise as to make a complete rotation of shaft 14. As the handle again approaches its normal position, finger 21 must either be in close to handle 17 or it contacts with cam 27 so that it is necessarily checked in its travel by abutment 26. During this rotation of shaft 14, material is being fed through tubular extension 28 and discharged from outlet spout 29. Obviously, the rotation of the handle results in the discharge of a certain quantity of material.

The entire device rests on base 30, which is secured by screws 31 to support 32 integral with hopper 12.

I claim:—

1. The combination of a container having an open mouth adapted to receive a hopper, a tubular extension on said hopper, a shaft supported at one end by the end wall of the hopper, a cap closing the end of said tubular extension, said cap rotatably supporting the other end of said shaft, a worm on said shaft extending thru said hopper and said extension, an arm rigid with said shaft exterior of said cap, said extension having an opening in the bottom thereof, a bell crank lever pivoted on said arm, one leg of said lever being adapted to be manually grasped for rotating said arm, a stop on said cap for preventing the rotary movement of the other leg of said bell crank lever on said shaft, a guide on said cap for directing said last mentioned leg against said stop, means limiting the movement of said last mentioned leg away from said arm, said leg being movable to avoid said stop and permit the continued rotation of said shaft in one direction.

2. The combination of a hopper adapted to be inserted into the open mouth of a container, a worm in said hopper, an arm for rotating said worm, and means adapted to interrupt the rotation of said worm on one complete revolution thereof, said means being operative to then permit a further rotation of said worm in the same direction without reversal of movement of said arm and without resetting said means.

In testimony that I claim the foregoing I have hereunto set my hand at Waukesha, in the county of Waukesha and State of Wisconsin.

LIVINGSTON A. THOMPSON.